US007225262B2

(12) United States Patent
Macdonald et al.

(10) Patent No.: US 7,225,262 B2
(45) Date of Patent: May 29, 2007

(54) SYSTEM AND METHOD FOR SELECTING AN EXTERNAL USER INTERFACE USING SPATIAL INFORMATION

(75) Inventors: George M. Macdonald, Stamford, CT (US); Jean-Hiram Coffy, Norwalk, CT (US)

(73) Assignee: Pitney Bowes Inc., Stamford, CT (US)

( * ) Notice: Subject to any disclaimer, the term of this patent is extended or adjusted under 35 U.S.C. 154(b) by 522 days.

(21) Appl. No.: 10/064,293

(22) Filed: Jun. 28, 2002

(65) Prior Publication Data

US 2004/0003098 A1 Jan. 1, 2004

(51) Int. Cl.
- G06F 15/16 (2006.01)
- G06F 15/173 (2006.01)
- H04L 9/00 (2006.01)
- H04K 1/00 (2006.01)

(52) U.S. Cl. ............... 709/229; 709/240; 713/170; 713/186; 370/238

(58) Field of Classification Search ............... 709/217, 709/219, 229, 240, 250; 370/228, 238, 357.01, 370/357.08, 357.13, 357.17; 342/357.01, 342/357.08, 357.13, 357.17; 713/170, 186, 713/200

See application file for complete search history.

(56) References Cited

U.S. PATENT DOCUMENTS

| 4,949,268 A * | 8/1990 | Nishikawa et al. ......... 701/216 |
|---|---|---|
| 4,988,981 A | 1/1991 | Zimmerman et al. |
| 5,223,844 A | 6/1993 | Mansell et al. ............. 342/357 |
| 5,327,160 A | 7/1994 | Asher ......................... 345/156 |
| 5,371,553 A | 12/1994 | Kawamura et al. ......... 348/734 |
| 5,437,010 A | 7/1995 | Blackman et al. .......... 395/161 |

(Continued)

FOREIGN PATENT DOCUMENTS

| EP | 1 045 302 A1 | 10/2000 |
|---|---|---|
| EP | 1 069 500 A1 | 1/2001 |
| WO | WO 01/41483 A1 | 6/2001 |

OTHER PUBLICATIONS

Communication Ubiquity Enables Ubiquitous Control—Brad A. Myers and Jeffrey Nichols; dated Nov. 27, 2001, accessed on Internet Jun. 28, 2002.

(Continued)

*Primary Examiner*—Yves Dalencourt
*Assistant Examiner*—El Hadji Sall
(74) *Attorney, Agent, or Firm*—George M. Macdonald; Steven J. Shapiro; Angelo N. Chaclas (57) ABSTRACT

A method and system for selecting an external user interface using spatial information is described. In one configuration the floor space of a mailroom is mapped using a two dimensional grid. At least one machine is located on the mapped grid and an associated control zone is defined for that particular machine. The machine includes a wireless transceiver for providing user interface access. An external portable processor with a wireless transceiver is provided with user interface logic for the machine. A user then moves the external portable processor into the control zone of the machine. An indoor positioning system is utilized to provide relative or absolute position information relating to the machine and the external processor. The system determines that the external processor is in the machine control zone and allows the external processor to function as a user interface for the machine.

17 Claims, 7 Drawing Sheets

U.S. PATENT DOCUMENTS

| | | | |
|---|---|---|---|
| 5,450,079 A | 9/1995 | Dunaway | |
| 5,457,478 A | 10/1995 | Frank | 345/158 |
| 5,495,077 A | 2/1996 | Miller et al. | |
| 5,561,446 A | 10/1996 | Montlick | 345/173 |
| 5,666,530 A | 9/1997 | Clark et al. | 395/617 |
| 5,684,706 A | 11/1997 | Harman et al. | 364/464.16 |
| 5,703,623 A | 12/1997 | Hall et al. | |
| 5,729,220 A | 3/1998 | Russell | 341/22 |
| 5,742,683 A | 4/1998 | Lee et al. | 380/23 |
| 5,812,865 A * | 9/1998 | Theimer et al. | 709/228 |
| 5,812,991 A | 9/1998 | Kara | 705/410 |
| 5,906,657 A | 5/1999 | Tognazzini | |
| 5,935,221 A | 8/1999 | Felmus et al. | |
| 6,005,945 A | 12/1999 | Whitehouse | 380/51 |
| 6,016,476 A | 1/2000 | Maes et al. | |
| 6,020,881 A | 2/2000 | Naughton et al. | |
| 6,081,795 A | 6/2000 | Ryan, Jr. | |
| 6,085,181 A | 7/2000 | Gravell et al. | 705/408 |
| 6,111,883 A * | 8/2000 | Terada et al. | 370/401 |
| 6,127,941 A | 10/2000 | Van Ryzin | |
| 6,141,688 A | 10/2000 | Bi et al. | 709/227 |
| 6,144,950 A | 11/2000 | Davies et al. | |
| 6,151,590 A | 11/2000 | Cordery et al. | |
| 6,167,346 A * | 12/2000 | Fukawa | 701/208 |
| 6,202,057 B1 | 3/2001 | Pierce | |
| 6,209,034 B1 | 3/2001 | Gladwin et al. | 709/227 |
| 6,223,029 B1 | 4/2001 | Stenman et al. | 455/420 |
| 6,243,682 B1 | 6/2001 | Eghtesadi et al. | |
| 6,249,777 B1 | 6/2001 | Kara et al. | 705/404 |
| 6,266,055 B1 | 7/2001 | Mozdzer et al. | 345/333 |
| 6,295,359 B1 | 9/2001 | Cordery et al. | 380/44 |
| 6,307,571 B2 | 10/2001 | Mozdzer et al. | 345/762 |
| 6,341,274 B1 | 1/2002 | Leon | 705/410 |
| 6,374,306 B1 * | 4/2002 | Tognazzini | 709/248 |
| 6,407,779 B1 | 6/2002 | Herz | |
| 6,460,076 B1 * | 10/2002 | Srinivasan | 709/219 |
| 6,584,490 B1 * | 6/2003 | Schuster et al. | 709/200 |
| 6,650,894 B1 | 11/2003 | Berstis et al. | 455/420 |
| 6,725,300 B1 * | 4/2004 | Nagasaka et al. | 710/62 |
| 6,747,598 B2 * | 6/2004 | Bajikar | 342/357.17 |
| 6,808,116 B1 * | 10/2004 | Eslambolchi et al. | 235/492 |
| 6,816,437 B1 * | 11/2004 | Teller et al. | 367/125 |
| 6,920,561 B1 * | 7/2005 | Gould et al. | 713/186 |
| 2001/0000433 A1 | 4/2001 | Russell | 341/20 |
| 2003/0011467 A1 | 1/2003 | Suomela | 340/7.1 |
| 2003/0043054 A1 | 3/2003 | Wachter | 340/825.69 |
| 2003/0058269 A1 | 3/2003 | Dunstan | 345/734 |
| 2003/0080875 A1 | 5/2003 | Wathen | 340/825.72 |
| 2003/0083894 A1 | 5/2003 | Ball et al. | 705/1 |
| 2003/0103075 A1 | 6/2003 | Rosselot | 345/717 |
| 2003/0103088 A1 | 6/2003 | Dresti et al. | 345/835 |

OTHER PUBLICATIONS

Floor Control in a Highly Collaborative Co-Located Task—Brad A. Myers, Yu Shan A. Chuang, Marsha Tjandra, Mon-chu Chen, and Chun-Kwok Lee, undated, accessed on Internet Jun. 28, 2002 at http://www.cs.cmu.edu/~pebbles.

Generating Remote Control Interfaces for Complex Appliances—Jeffrey Nichols, Brad A. Myers, Michael Higgins, Joseph Hughes, Thomas K. Harris, Roni Rosenfeld, Mathilde Pignol, undated, accessed on Internet Jun. 28, 2002 at http://www.cs.cmu.edu/~pebbles.

Personal Interfaces in Ubiquitous Environments—Position paper for the CHI'2001 Workshop on Building the Ubiquitous Computing User Experience—Jeffrey Nichols, Brad A. Myers and Rob Miller, undated, accessed Jun. 28, 2002.

Requirements for Automatically Generating Multi-Modal Interfaces for Complex Appliances—Jeffrey Nichols, Brad Myers, Thomas K. Harris, Roni Rosenfeld, Stefanie Shriver, Michael Higgins and Joseph Hughes, undated, accessed on Internet Jun. 28, 2002 at http://www.cs.cmu.edu/~pebbles.

Studying The Use of Handhelds to Control Everyday Appliances—Jeffrey Nichols and Brad A. Myers, undated, accessed on Internet Jun. 28, 2002 at http://www.cs.cmu.edu/~pebbles.

User Interfaces that Span Hand-Held and Fixed Devices—Position paper for the CHI'2001 Workshop on Distributed and Disappearing User Interfaces in Ubiquitous Computing—Brad A. Myers, Jeff Nichols and Rob Miller, undated, accessed Jun. 28, 2002.

Centimeter-Accuracy Indoor Navigation Using GPS-Like Pseudolites—GPS World, dated Nov. 1, 2001.

M. Beard, et al., What I need is what I get: downloadable user interfaces via Jini and Java, CHI '01, Seattle, Wash., 2001, pp. 15-16.

A. Krebs, et al., Mobile adaptive applications for ubiquitous collaboration in heterogeneous environments, ICDCSW, 2002, pp. 401-407.

B. Meyers, Using Handhels and PCs Together, Comm of ACM, vol. 44, No. 11, 2001, pp. 34-41.

J. Nichols, Using handhelds as controls for everyday appliances: a paper prototype study, CHI '01, Seattle, Wash., 2001, pp. 443-444.

N. Priyantha, et al., The Cricket location-support system, Proc. 6th an. international conference on Mobile computing and networking, Boston, Mass., 2000, pp. 32-43.

C. Randall, et al., Low Cost Indoor Positioning System, Ubicomp 2001: Ubiquitous Computing, pp. 42-48, Springer-Verlag, 2001.

Bahl, et al., RADAR: An In-Building RF-based User Location and Tracking System, Infocom 2000, Proceedings IEEE, vol. 2, pp. 775-784, Mar. 2000.

Palmer, A Spread Spectrum Acoustic Ranging System—An Overview, Proc. Of the 2002 IEEE Canadian Conference on Electrical & Computer Engineering, vol. 3, pp. 1242-1245, May 2002.

Prigge, et al., An Indoor Absolute Positioning system with No Line of Sight Restrictions and Building-Wide Coverage, Proc. Of the 2000 IEEE Int. Conf. On Robotics & Sutomation, vol. 2, pp. 1015-1022, Apr. 2000.

Diggelen, et al., Indoor GPS: The No-Chip Challenge, GPS World, Sep. 1, 2001.

* cited by examiner

SYSTEM AND METHOD FOR SELECTING AN EXTERNAL USER INTERFACE USING SPATIAL INFORMATION

CROSS REFERENCE TO RELATED APPLICATIONS

This application is related to commonly owned, co-pending U.S. patent application Ser. No.: 10/064.294, filed on Jun. 28, 2002, entitled SYSTEM AND METHOD FOR A WIRELESS USER INTERFACE FOR BUSINESS MACHINES, which is hereby incorporated by reference in its entirety.

BACKGROUND OF THE INVENTION

The illustrative embodiments disclosed in the present application are useful in systems including those for providing user interfaces for business machines and more particularly are useful in systems including those for providing interchangeable co-located wireless user interfaces using position information for user interface selection.

There are several categories of conventional business machines in ubiquitous use today. The typical large office environment may include centralized business machine centers that often include copy machines, facsimile machines, printers, and mailing machines. These environments may include postage meters, weighing scales and mail processing machines such as inserters, folders and sorters. Large mail creation machines may include many subsystems including web printers, cutters, inserters, folders, stuffers and postage meters. Additionally, business machines may be found in satellite locations such as convenience centers in various locations, and may be located in individual offices and cubicles. In a typical small home office environment, business machines are often located in a single office and may include multi-function business machines such as a combined printer/scanner/copier/facsimile unit.

Business machines are also found in other environments such as production mail facilities and copy centers. Business machine usage accounting systems are often utilized in multi-user settings for tracking usage of the business machines according to various criteria. Such criteria may include a user identification number, a client identification number and/or a particular matter identification number. The usage accounting systems typically employ a separate accounting processor connected to the business machine having a separate user interface.

Mailing machines are commercially available from Pitney Bowes Inc. of Stamford, Conn. Mailing machines are available in a range of units having increasing functionality. A mailing machine may include a variety of modules or sub-systems for performing tasks such as singulating mailpieces from a stack, weighing a mailpiece, sealing the flap of an envelope, applying evidence of postage, printing information on the mailpiece, accounting for postage used, printing labels and stacking finished mailpieces. The mailing machine often includes a transport mechanism for feeding mailpieces through successive stages of the mailing machine. Mailing machines may include a postage meter that may account for and apply evidence of postage used for a mailpiece. A typical mailing machine will include various software modules for performing functions such as machine control, accounting and reporting functions. Certain mailing machines have multiple features and are configured so that the mailing machine may be provided with only a subset of the features enabled. Such a mailing machine would typically require that the user interface support all of the features of the machine.

Additionally, certain users may be experienced in is operation of a particular mailing machine and may not require an elaborate user interface. However, certain other users may require a more elaborate user interface. The typical mailing machine provides a sufficiently elaborate user interface for use by both the experienced and novice user. Accordingly, a user interface may be more complicated than a particular user requires it to be.

SUMMARY OF INVENTION

The present application describes a system for providing a wireless external user interface for a business machine.

In one illustrative embodiment, the system determines position information for an external user interface. It uses that information in determining whether to provide user interface access to the external processor for a particular machine. In an alternative, the external user interface logic is provided to the external processor by the machine.

In another illustrative embodiment, a portable processor is used to select a file to be processed. Portable processor position information is used to select a machine to process the file.

DETAILED DESCRIPTION

Wireless network devices are available that allow portable computers to access a network using wireless protocols such as BLUETOOTH™. Additional systems that comply with hardware layer protocols such as the versions of the IEEE 802.11 wireless systems standards are available as are systems that are also Wi-Fi compliant. Typical wired network interface cards (NIC) utilize the Ethernet protocol in which each individual Ethernet card produced is assigned a unique address. An address issuing authority ensures that the individual addresses assigned to the various Ethernet card manufacturers are unique.

Wireless systems utilizing IEEE 802.11b, 802.11g, or 802.11a typically provide wireless LAN access through a wireless access point. Similarly, Internet access may be provided using a wireless access point connected to a gateway. Bluetooth™ systems may also be utilized for LAN access and are also often utilized for Personal Area Network systems. Bluetooth™ systems range from class 1 systems that provide approximately 10-meter range through class 3 systems that typically provide 30-meter range and operate at approximately 1 Mbit/s. IEEE 802.11 systems typically provide 100-meter range with 802.11b operating at 10 Mbit/s and 802.11a operating at 54 Mbit/s. Profile based protocols such as Wi-Fi enable across-vendor compatibility for systems.

Systems employing protocols such as BLUETOOTH™ and 802.11b are generally wireless systems operating in the RF bands. Wired networks generally must be physically tapped for eavesdropping. However, an appropriate receiver, such as one located in a parking lot, may intercept wireless systems communications.

A system for a wireless mailroom having a gateway server to allow remote access is described in commonly owned U.S. patent application Ser. No. 10/021,583, filed Oct. 29, 2001 and incorporated herein by reference in its entirety. The embodiments described in the present application utilize network systems. It is to be understood that segments or all of local networks described in the embodiments could be assigned individual global addresses. It is also possible that one or more gateways or proxy servers could be utilized so that a sub-network of many devices using one addressing scheme could be provided access to another network through a gateway that has a single address for each gateway from the perspective of a device on the network higher up the hierarchy chain.

The wireless communication channels described typically operate in the 2.4 GHz spread spectrum frequency bands, but any wireless communications channel could be utilized. Radio frequency channels are preferable for a communications channel in a mailroom crowded with machines and people. However, other bandwidths may be used as well, particularly in the positioning systems utilized.

A reference directed toward a Mailing Machine Disabling a Keyboard/Display of a Resident User Interface Which Has Function Keys and the Keyboard/Display if an External User Interface is Connected is described in U.S. Pat. No. 5,935,221 to Felmus, et al. and is incorporated herein by reference in its entirety. The Felmus patent describes a system for disabling the internal keyboard and display of a mailing machine in the presence of an external user interface. The embodiments described therein may be alternatively utilized with the embodiments described herein.

A reference directed toward a Universal Access Photocopier system is described in U.S. Pat. No. 6,243,682 to Eghtesadi, et al. and is incorporated herein by reference in its entirety. The Eghtesadi patent describes a system for providing voice control of a photocopier machine. The embodiments described therein may be alternatively utilized with the embodiments described herein.

A reference directed toward a System Using Position detector to Determine Location and Orientation Between Computers to Select Information to be Transferred Via Wireless Medium is U.S. Pat. No. 6,374,306 to Tognazzini and is incorporated herein by reference in its entirety. The Tognazzini patent describes a system for determining position information of a handheld device relative to a desktop computer using an ultrasound system, an infrared system or a Polhemus-type six degree of freedom locator. The reference describes holding a handheld in front of a portion of a computer screen that is displaying a computer file icon. A portion of the computer screen display bleeds through to the handheld and a user can then select the file for transfer to the handheld. Such a positioning system may be utilized with the embodiments herein.

The Global Positioning System (GPS) includes a system of satellites positioned in earth orbit that transmit microwave signals to GPS receivers that receive the signals from one or more of the satellites. The receiver uses GPS signal information to determine the absolute position of the receiver in latitude and longitude, usually to within several feet accuracy. The system may also be utilized to determine other parameters including the speed of the receiver and the altitude of the receiver. However, GPS signals travel a great distance and are very weak when received on Earth. For example, receivers often cannot utilize GPS signals indoors because of the further attenuation of the signals due to interference from the structure of buildings. Additionally, multi-path reflection errors often degrade the location determination performance of a receiver in a city environment. GPS repeaters may be utilized to boost signals into an indoor environment, but such system may not provide precise location data. In automotive applications, other data sources such a compass and gyroscope may be used to provide additional data.

Radio navigation systems such as LORAN have been in use in the maritime industry in which the radio navigation beacons are utilized with their known stationary positions in order to use positioning algorithms such as triangulation to determine the position of a receiver. In some systems, GPS systems and radio navigation systems are used together to provide more data regarding position.

Centimeter accuracy indoor navigation systems using GPS-like Pseudolites are known and may be utilized to provide absolute or relative position information for a receiver connected to a portable processor such as a laptop, PDA, WAP, tablet-computing device or wireless telephone such as a JAVA phone. Positioning systems have been developed for use in 911 positioning systems.

Known radio frequency, ultrasonic and infrared techniques may be utilized for providing position information relating to the absolute or relative position of an external processor. For example, the external processor could be a PDA being used as an external user interface for a machine such as a copier. Such a PDA could also be used for other functions. A reference directed toward describing a system for a Low Cost Indoor Positioning System, by C. Randall and H. Muller is shown in Ubicomp 2001: Ubiquitous Computing, pp. 42-48, Springer-Verlag, 2001, G. Abowd, ed. and is incorporated herein by reference.

In one embodiment, a system and method for providing discriminating user interface access to a business machine is shown for reconfigurable external user interfaces in an environment having several business machines. A handheld computer with wireless access uses Java to reconfigure the handheld as a user interface for different types of business machines and different units of the same type in a crowded mailroom. The mailroom is equipped with a centimeter accuracy wireless positioning system. The floor of the mailroom is organized in a grid and each business machine is assigned a portion of the grid. When a handheld is in the machine control grid, it controls the machine. The business machine can update the handheld user interface. There is also a conflict resolution system to ensure that people passing by the machine control active box for a business machine do not interfere with the current user.

The present application describes several new and useful systems and methods for using position information to select an external user interface. Additionally, modifications to known positioning techniques and new positioning techniques are described.

External Processor Reported Position

Figure 1:
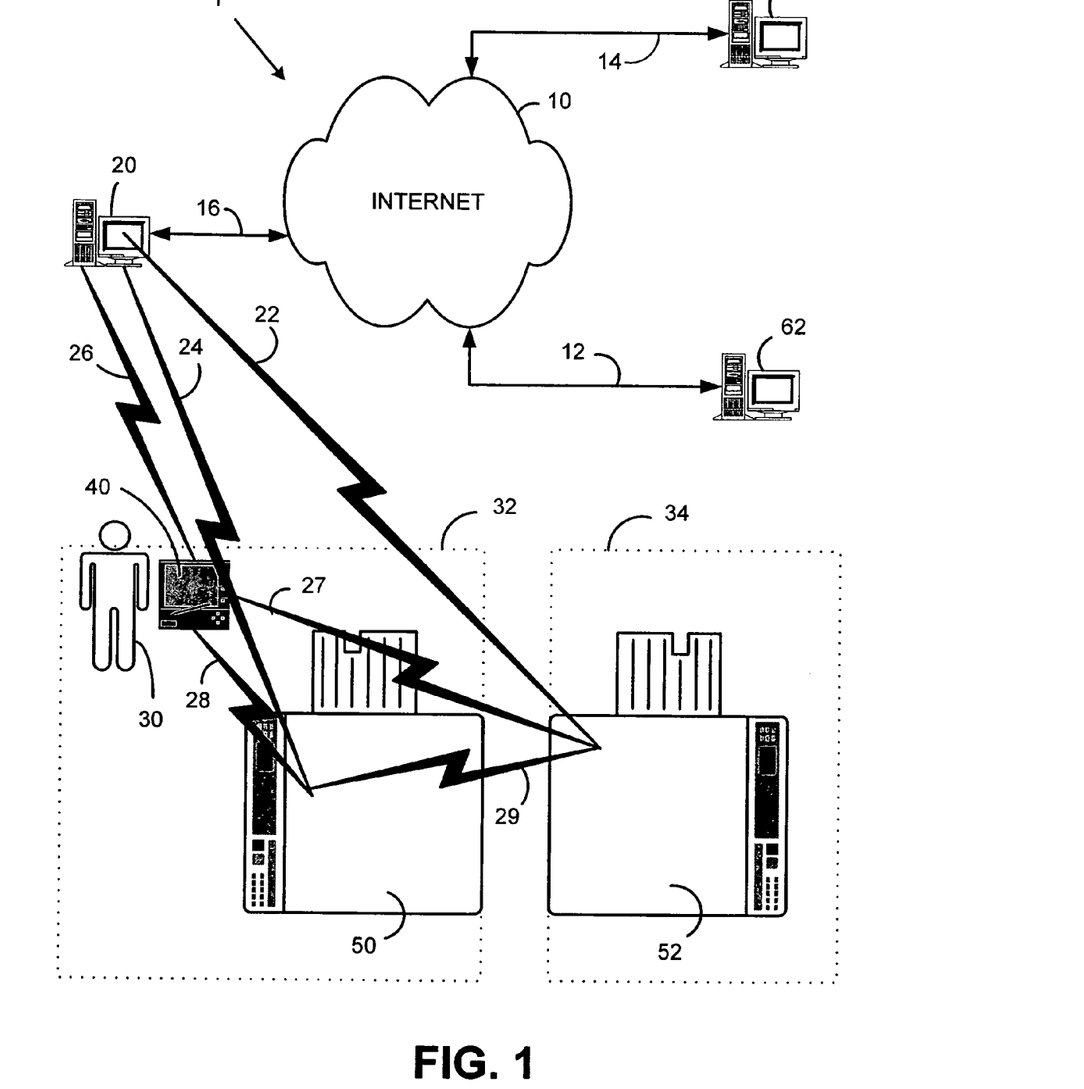
FIG. 1 is a schematic diagram of an illustrative user interface system used in an embodiment of the present application.

Referring to FIG. 1, a first illustrative embodiment of a system according to the present application is described. An external user interface processing system 1 is shown. Authentication servers 60 and application logic servers 62 are connected to the Internet 10 using communications channels 14, 12 respectively. Here, network 10 is the Internet and connections 12, 14 are T1 lines. Mailroom server 20 is connected to Internet 10 using connection 16 that is a T1 line. User 30 has a portable processor 40. Here, the portable processor is a pen-based computer with a BLUETOOTH™ wireless transceiver and an indoor positioning system receiver. Alternatively, a handheld computer such as a PALM or HANDSPRING computer may be utilized. Similarly, a notebook computer or WINDOWS ® CE platform machine could be utilized. The indoor position system (not shown) provides position information regarding the handheld 40 to server 20.

In this embodiment, the external processor 40 includes a receiver that determines position information such as x-y coordinates in a relative or absolute mapped grid in a mailroom. The mailroom has a grid in which machines 50, 52 have control areas 32, 34 respectively defined on the mapped grid. Machine 50 has communications connections to the server 20, machine 52 and handheld 40 across a BLUETOOTH™ network using connections 24, 29 and 28 respectively. Similarly, machine 52 has BLUETOOTH™ connections 29, 27 and 32. Handheld 40 connects to machines 50, 52 using BLUETOOTH connections 28, 27 respectively, and to server 20 using connection 26.

In this embodiment, the handheld sends position information to the server 20. The server stores data defining the control areas 32, 34 on the grid and determines when a handheld 40 is in a particular control grid. As shown, Handheld 40 is in grid 32 and will control machine 50. Here, server 20 has a BLUETOOTH™ gateway for access to other third party servers. The server 20 then provides a shared secret such as the BLUETOOTH™ passkey to the machine 50 and handheld 40 so that they can pair. Here, the handheld 40 is a master and the machines are the slaves in the machine control connection. The handheld 40 is the master and server 20 the slave in the position information and key transfer connections. Bonding could be utilized as well.

After the passkey is transferred, the handheld 40 and machine 50 pair and then machine 50 transfers control to the handheld 40 until a timeout, explicit relinquishment of control, or positional relinquishment of control which occurs when handheld 40 leaves the control area. Additionally, the machine may be instructed to remove machine 50 from control by a priority processor such as server 20 that prioritizes the handheld connections.

Alternatively, the handheld 40 could dock with the server for key information for all the machines 50, 52. Then the machines 50, 52 could allow user interface access based upon position data.

Alternatively, a system such as 802.11b can operate in a peer-to-peer mode. However, because such a system is not an ad-hoc network, the server must manage the connections. In the preferred embodiment, BLUETOOTH™ systems provide an ad-hoc network with little user setup.

Alternatively, as can be appreciated, the position information may be sent to the handheld 40, machines 50, 52, the server 20, or any combination thereof. Additionally, other appropriate wireless and wired networks and connections may be utilized. As can be appreciated, various communication flows may be utilized, some of which will be chattier than others.

Here, it is contemplated that different portable processors may be utilized in the system. Accordingly, the machines or user interface servers utilize the capabilities of the portable processor to determine what user interface logic to present to a user. Additionally, user preferences could be utilized to pre-configure the user interface and the user may be allowed to store personal macros for each type of machine that is to be operated. It is understood that a portable computer used as an external user interface may store more than one user interface logic program that could then each be selected when necessary.

In an alternative, the system utilizes SyncML over Bluetooth™ to ensure that the most recent version of the particular user interface being utilized is loaded in the portable computer.

Server Reported Position

Figure 2:
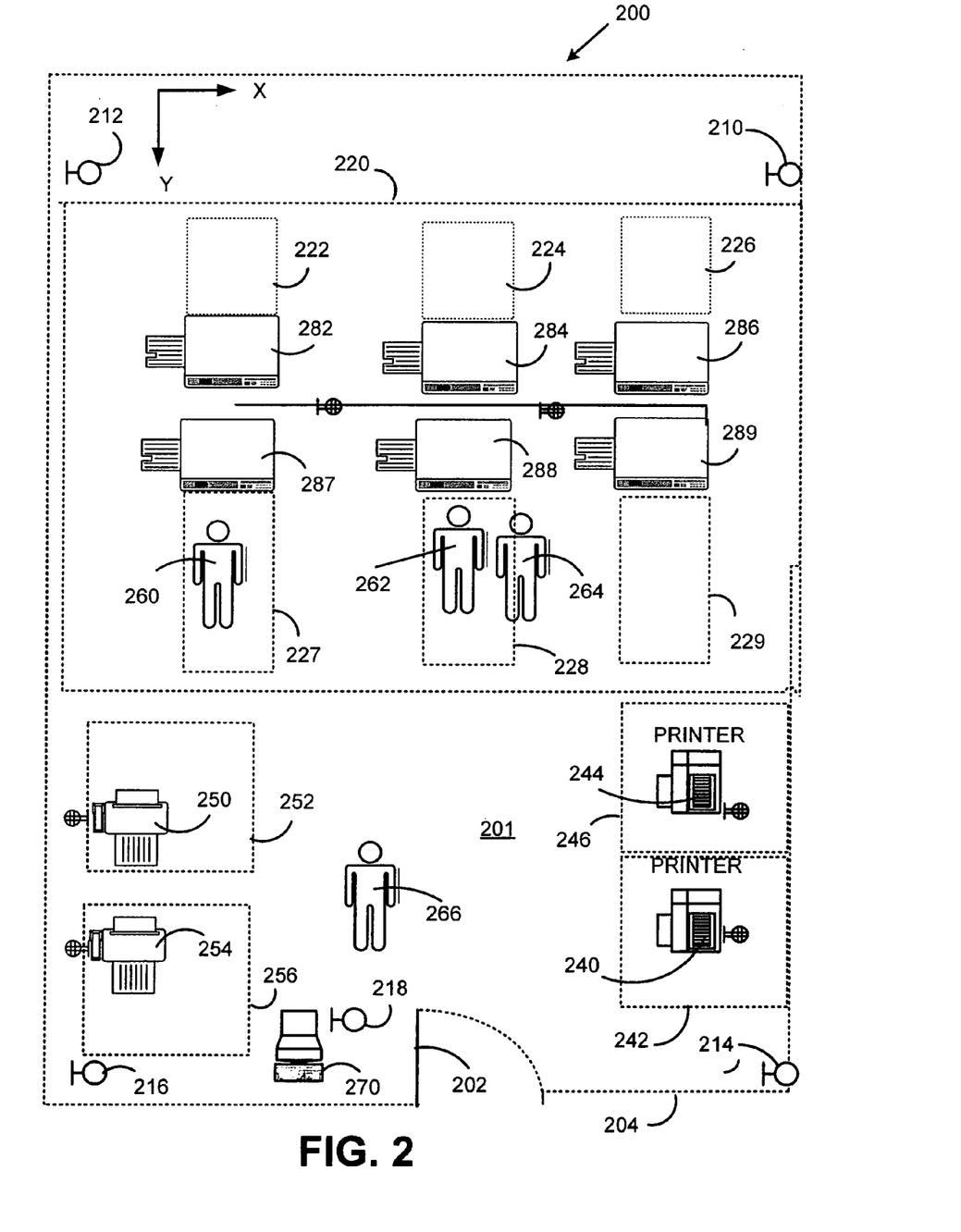
FIG. 2 is a schematic representation of an illustrative user area and user interface system in accordance with an embodiment of the present application.

Referring to FIG. 2, another embodiment of the present application is described with a schematic representation of a mailroom. In a second embodiment, an external user interface processing system 200 is shown in a mailroom 201. The mailroom 201 includes walls 204 that define an outer perimeter of a mapped grid area. The mailroom 201 has a door 202 and floor space that is mapped into a grid. Positioning transducers 210, 212, 214, 216 and reference transducer and reference point 218 provide positioning signals to the room 201.

The transducers utilize ultrasonic and RF technology using known techniques. Various levels of grids may be defined. Here, a room grid 201 encompasses the entire room area. Area 220 encloses the copier control area and is for a group of identical or similar machines. Each copier 282, 284, 286, 287, 288 and 289 has associated a defined control grid 222, 224, 226, 227, 228, and 229 respectively. Here, facsimiles 250, 254 each have control grids 252, 256 respectively. Here, printers 240, 244 each have control grids 242, 246 respectively. It is to be understood that many different configurations of machines may be utilized. Users 260, 262, 264 and 268 each have handheld external processors (not shown) that may be used for external user interface purposes for one or more of the machines among other uses. Server 270 is connected to the machines and the user external processors (not shown) using an ad-hoc BLUETOOTH™ network. Alternatively, an 802.11 peer-to-peer network may be configured and utilized. Here, the server is reporting handheld position to the machines and informing the machines which handheld to provide access to. The server may instruct the machine, which handheld to provide access to using a 48 bit unique MAC addresses, or a piconet address. Here, the server may instruct that user 262 have priority over 264 due to his position in the control grid.

As can be appreciated, known software update systems may be used to ensure that the handhelds have the latest or acceptable version of the user interface. As described below, customization of the interface is possible for each handheld as well as data reporting and authentication of a user. Here, when a user 266 enters a room 201, the server 270 makes sure the user has all required software. Then when a user enters a group control area 220, the appropriate user interface is loaded. Then in control area 228, the copier provides real time status data and transfers user interface control to user 262. Release procedures are discussed herein. Each machine is provided at least a power and/or emergency stop button as a user interface.

Alternatively, priority can be determined based upon a hierarchal structure of handhelds or handheld users.

Machine Relative Position

Figure 3:
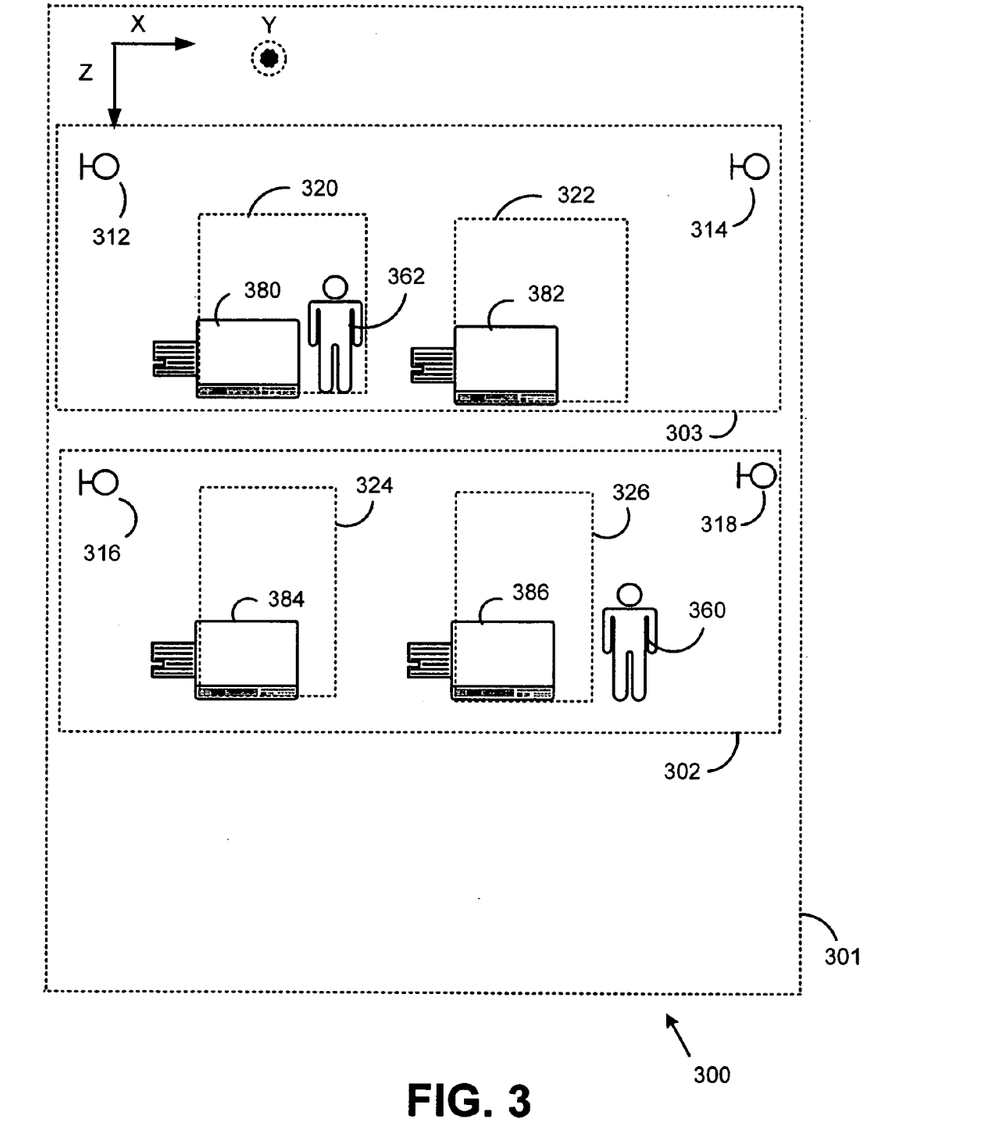
FIG. 3 is a schematic representation of two illustrative user areas in accordance with another embodiment of the present application.

Referring to FIG. 3, another embodiment of the present application is described with a schematic representation of two mailrooms on differing floors of a building. In this embodiment, a building 300 may have multiple mailrooms 302, 303 in a perimeter 301. In this embodiment, the machines include a receiver capable of direction finding and distance determination on a signal such as a beacon. In this example, the external processor utilizes a beacon that includes identification information in the beacon signal. As can be appreciated, the other positioning systems described could be used as well.

The mailrooms 302, 303 include positioning systems 316, 318, and 312, 314 respectively. Mailroom 302 includes machines 384, 386 having 3-D control areas defined as 324, 326 respectively. Similarly, mailroom 303 has machines 380, 382 having 3-D control areas defined as 320, 322 respectively.

In an alternative, the positioning systems resolve position information in three dimensions so that the two mailrooms do not interfere with each other. In another embodiment, each positioning system is on a separate channel or has a differentiating code to avoid interference. Here user 362 is given control of copier 380, but not 384. Also, user 360 is not given control of copier 382 which may have that x-y position in its control grid, but not the y position.

In this example, the copiers 380, 382, 384 and 386 include an external user interface access system. The copier includes a Bluetooth™ transceiver and can provide user interface logic to a properly authenticated external user interface if the external processor does not have a usable external user interface logic program suitable for the copier. Here, the external processor includes a Bluetooth™ transceiver for communications with the business machines and servers and gateways, but also includes a radar signal transmitter that emits a radar signal using known low power radar transmission techniques. The copier includes a passive radar receiver that determines the direction and distance of the external processor. The copier is assigned a control grid relative to the copier. For example, the two dimensional floor space around the copier is defined in terms of distance and direction in radial coordinate space. The control zone may be defined in radial coordinates or be converted into Cartesian coordinates. The copier may utilize a multi-channel receiver to track several external user interface devices.

For example, a Bluetooth master transceiver in the copier may keep the closest 7 external processors as active slaves and all the rest as inactive slaves. If access to the inactive parked slaves is required, one or more of the active slave slots may be utilized.

In one alternative, the copier could be assigned likely approach paths and ignore signal sources from other directions such as the rear of the copier. Each external processor is assigned a unique identification signal that is sent in the radar pulse. The copier may then utilize the information to determine a Bluetooth™ address for the external processor in order to set up pairing with the external processor. The copier may then also require additional authentication of the user before providing user interface access to the external processor. However, in another embodiment, the identification information could be provided by another communications channel such as by an infrared link.

Alternatively, each external user interface is assigned a time slice for sending the radar signal. Accordingly, the time information could be used to identify the external processor and the Bluetooth™ transceiver of the external processor is paired with the copier and the copier then allows the external processor to control the copier as its external user interface.

As shown in FIG. 3, the Z dimension can be added using altitude measurements to enable a multi floor mailing facility or satellite facilities around a building. As can be appreciated, a purely signal strength RF distance locating system with an omnidirectional signal may have overlap between the machines and be unable to select the user interface and accurately position the devices. However, triangulation systems may be utilized.

Conflict Resolution

Figure 4:
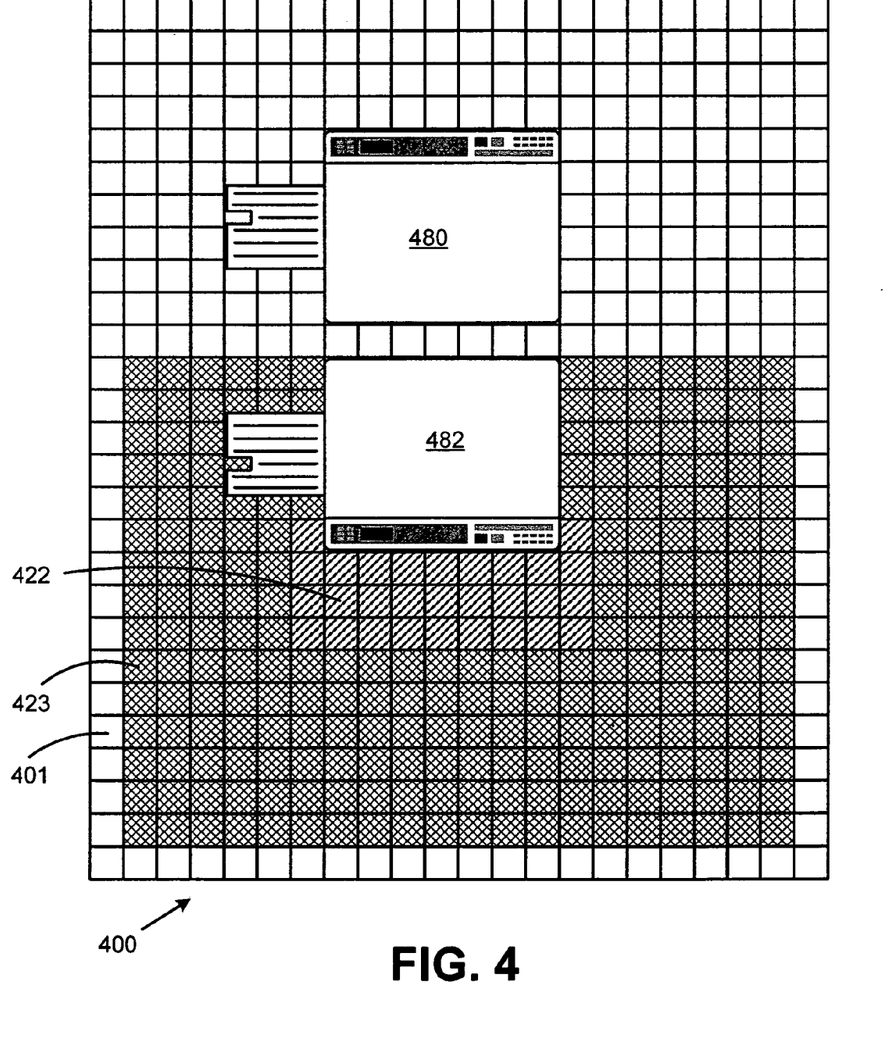
FIG. 4 is a schematic representation of a portion of an illustrative user area in accordance with another embodiment of the present application.

Referring to FIG. 4, a partial floor grid 401 of a mailroom 400 is shown including machines 480 and 482. In this illustrative alternative, applicable with any of the embodiments, a two-tier position based priority scheme is shown. It is possible that more than one user, each having an external processor, may be present in the control zone 423 for a machine 482. For example, user A and user B (both not shown), with external processor AP and BP (not shown) respectively are in the control zone 423 of copier 482. Here, a priority section 422 of the control zone 423 is defined as having precedence over the other areas of the full control zone 423. Accordingly, if user A is in zone 422, and user B is in the control zone 423, but not in the priority zone 422, user A will be given control of the machine 482. In an alternative, if both users are in the control zone 423, they are given access on a first-come first served basis and maintain control until relinquished. In another alternative, users in the control zone 423 that do not have priority are provided machine status data, but not control ability.

In another example, user A was in the control zone first and will maintain control of copier 482 until user A leaves the control zone with external user interface AP.

Postage meters may be characterized as operating in an open meter manner or a closed meter manner. A typical closed system postage meter includes a dedicated printer for printing evidence of postage used. A typical open system meter may utilize a general-purpose printer. Postal funds are often stored in a postal security device (PSD) that may employ a secure accounting vault. Here, postage machines may be the machines that are being controlled by the user and may utilize funds accounting local to the handheld or external to the handheld.

In an alternative applicable in any embodiment, the handheld could provide biometric authorization, accounting, personal macro storage and data file storage such as files to be printed. Each machine has a reconfigurable access grid and groups of like machines are assigned group grids. A mailroom assigns a mailroom grid for group of unlike machines. The centimeter accuracy positioning system has transmitters, a reference point and a controller. Each handheld can resolve position absolutely or relatively in the system. When the employee enteres the mailroom, the handheld could check that all user interfaces are up to date by querying the machines or the controller. The handheld could utilize Wi-Fi or Bluetooth™ for the wireless connections. A group of copiers can have a first zone defined such that inside the zone the copier interface is loaded. Then when the handheld enters a particular machine zone, the appropriate machine is selected and current operational parameters downloaded.

In an alternative, a mailroom employee could have a single PDF file that has black and white and color pages. The employee could store the file on the handheld and print the black and white pages by walking to the black and white copier/printer 482. The employee could start the job, then walk to the color copier/printer 480 and start printing that part of the job.

File Selection and Manipulation

Figure 5:
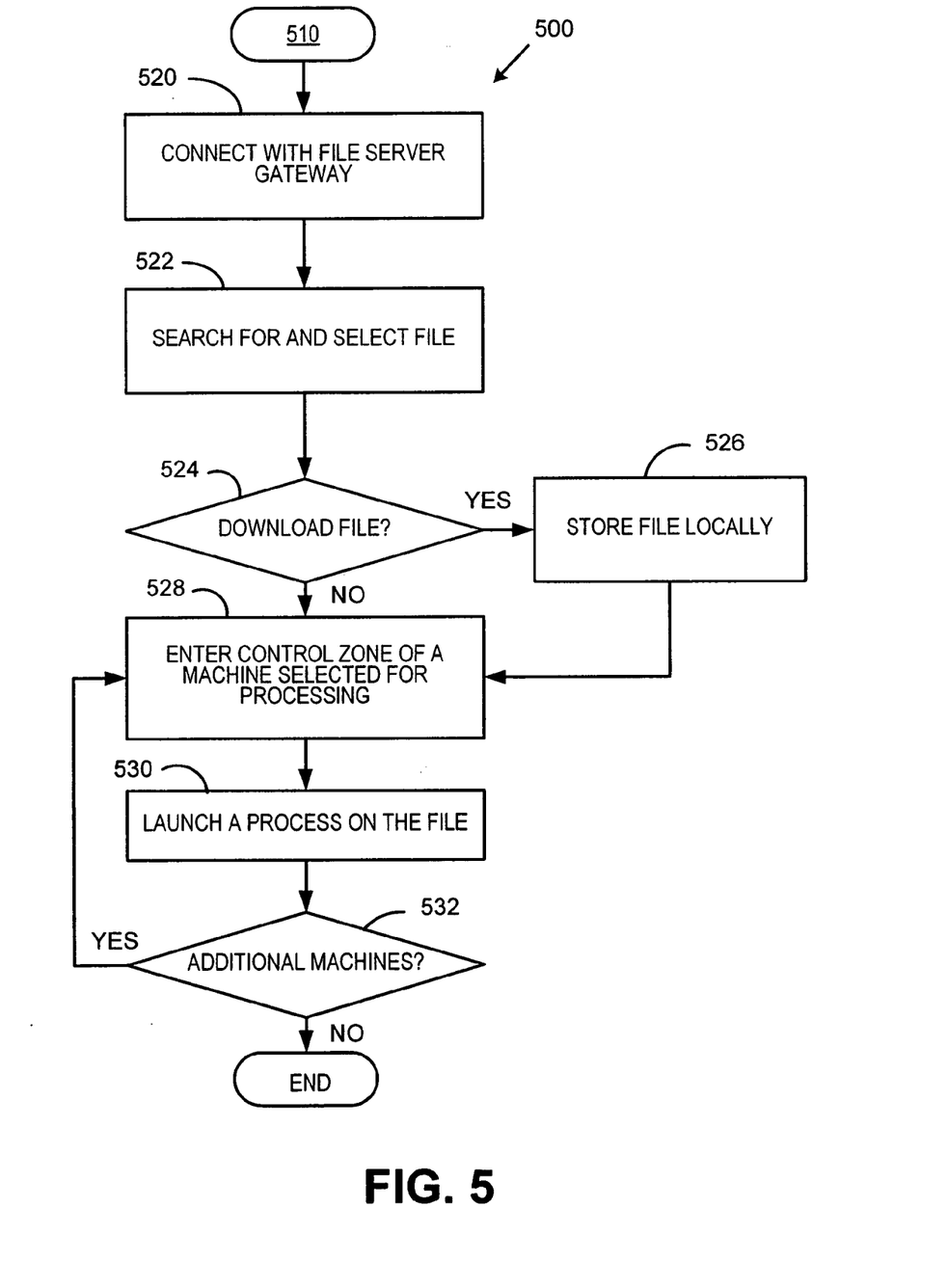
FIG. 5 is a flow chart showing an illustrative process for file processing according to an embodiment of the present application.

Referring to FIG. 5, an embodiment of the present application is described in which a computer file is selected for processing. The process may be utilized with any of the systems described including the one of FIG. 2. The user has a PDA with Bluetooth™ access to a file server or other network device storing a desired file. The network access could be direct or through a gateway. The process 500 starts in step 510 and proceeds to step 520. In step 520, the handheld connects to a file server or gateway. In step 522, the user searches for the file. The user may utilize the familiar graphical interface of the PDA to search for the desired file. When the user has located the desired file on the network, the user selects the file. In step 524, 526, the user decides whether to download the file to the handheld. In step 528, the user enters the control zone of a machine such as a printer and processes the file. In step 530, the user launches the process and the file is manipulated. In step 532, the process determines if additional processing is required. If so, control returns to step 528 and if not, the process ends.

In the alternative embodiment, the selected computer file is downloaded to the handheld and may be manipulated be user programs before being processed by a machine. For example, the user could utilize the handheld to access a file server or desktop computer that stores a report computer file. The user could edit the file or split it into parts for processing. In an alternative, a Bluetooth™ personal area network and gateway can be used to allow the handheld user to select files from a desktop or server file storage device and also select where to print such as by walking into the printer access box.

Position and Authentication

Figure 6A:
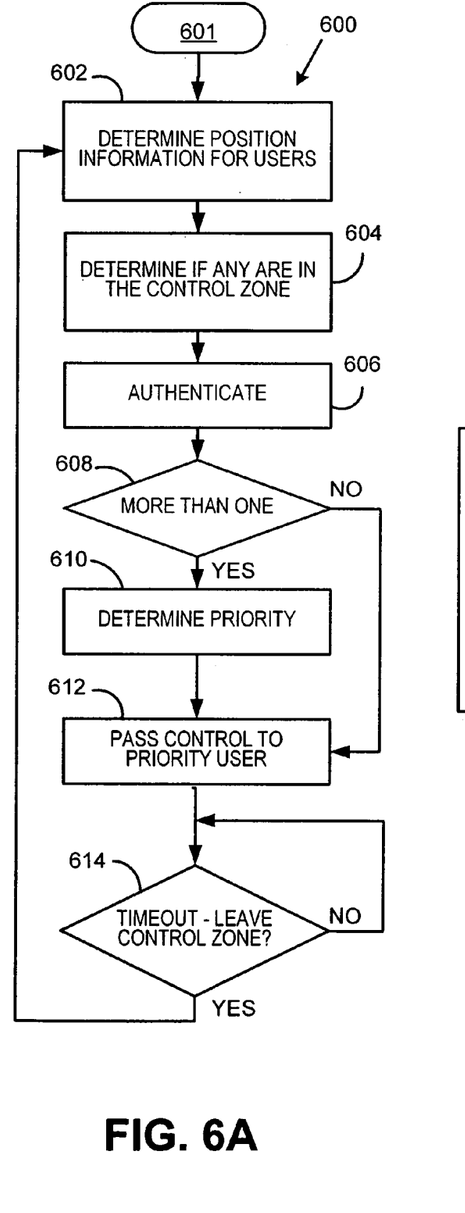
FIG. 6A is a flow chart showing an illustrative process for user interface selection according to an embodiment of the present application.

Referring to FIG. 6A, an embodiment of the present application is described in which user position is determined. The process 600 begins in step 601 and proceeds to step 602 to determine position information for users. Several methods may be utilized. For example, a server could track multiple handheld devices. Additionally, a handheld could report location to a machine. Furthermore, a machine could track handheld devices. In step 604, the process polls to determine if any user is in the control zone of a machine. In step 606 the user is authenticated. In step 608, the process determines if more than one user is in a control zone. If so, user priority is determined and control is passed to the user who has priority. If there is only one user, control is passed to that user. The machine then polls to determine whether to remove control access from the handheld in step 614. If the user relinquishes control, the process 600 loops to the beginning to look for new users.

As an alternative, many priority schemes may be used. A pure timeout could be used; a hierarchal system may also be used.

Figure 6B:
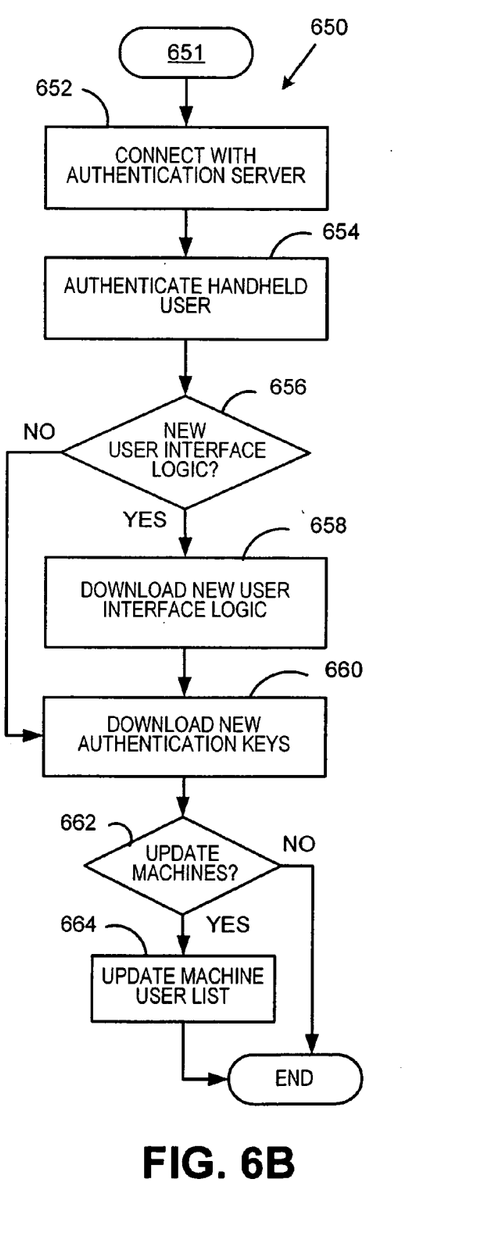
FIG. 6B is a flow chart showing an illustrative process for user authentication according to an embodiment of the present application.

Referring to FIG. 6B, an embodiment of the present application is described in which authentication is determined. The process 650 begins in step 651 and proceeds to step 652 to connect with an authentication server. In step 654, the process authenticates a handheld or handheld user. In step 656 the process determines if new user interface logic or other data or logic is required for processing or security and if so it is downloaded in step 658. In step 660, the server downloads new keys or password information and in step 662, the process determines if the machines need any updates to code, keys or other data. If so, they are updated in step 664 and the process ends.

Machine Access System

Figure 7:
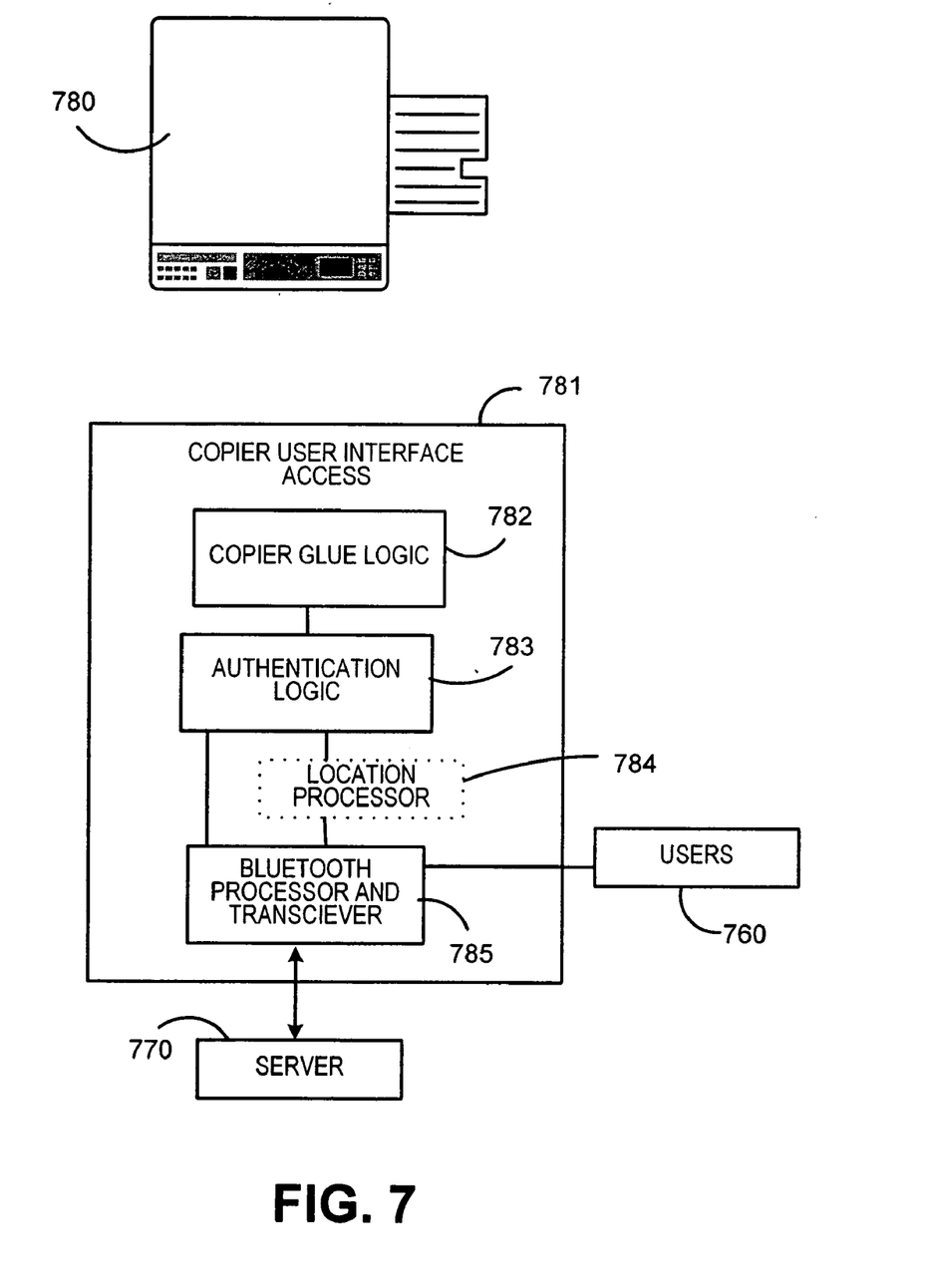
FIG. 7 is a block diagram of an illustrative machine interface according to an embodiment of the present application.

Referring to FIG. 7, a block diagram for a machine access controller is shown. Here machine 780 has Copier User Interface Access system 781. The server 770 has wireless Bluetooth access to the interface 781 using a Bluetooth™ Processor and Transceiver 785 for many levels of the network model and also security processes. Similarly, users 760 have access to the processor 785. The machine 780 may have a location processor 784. There is authentication logic 783 and copier glue logic 782 to provide access from the user interface to the copier control systems.

In an alternative applicable to any of the embodiment, the external user interface may allow customization of each machine user interface logic program stored in the external processor. Here, the external processor may also store macros and other interface logic that is not typically provided in the user interface. For example, the external processor could provide accounting system features that are typically provided by another accounting processor that is attached to a copier and has a separate user interface.

In another alternative applicable to any of the embodiments, the external processor comprises a Wi-Fi capable hand-held pocket PC such as the Toshiba e740 Pocket PC. Furthermore, differing types of processors and logic systems may be supported. For example, Java based PALM OS devices may be utilized. The user interface logic could be provided in JAVA or PALM OS format. Similarly, other portable computing devices such as laptop computers, tablet computers and Windows CE based portable wireless capable computers could be utilized.

In another alternative applicable to any of the embodiments, the machine being controlled requires that the data being sent be cryptographically protected from tampering before being placed into any encrypted communications packet such as WEP. For example, the machine being controlled may include a mailing machine having a postage meter for printing indicia as evidence of postage paid. As described in the related application, the printer in the mailing machine may be secured using cryptographic techniques to defeat fraud attacks such as duplicate prints of the same indicia. Similarly, impersonation attacks could be defeated with such a system.

The present application describes illustrative embodiments of a system and method for selecting an external user interface using spatial information. The embodiments are illustrative and not intended to present an exhaustive list of possible configurations. Where alternative elements are described, they are understood to fully describe alternative embodiments without repeating common elements whether or not expressly stated to so relate. Similarly, alternatives described for elements used in more than one embodiment are understood to describe alternative embodiments for each of the described embodiments having that element.

The described embodiments are illustrative and the above description may indicate to those skilled in the art additional ways in which the principles of this invention may be used without departing from the spirit of the invention. Accordingly, the scope of each of the claims is not to be limited by the particular embodiments described.

The invention claimed is:

1. A method for selecting a first external processor as a user interface to a first machine comprising:

accessing control grid position information for the first machine;

obtaining position information for the first external processor using a positioning system having an effective positioning area;

using the control grid position information and the first external processor position information in determining whether a first external processor is in the control grid of a first machine, and only if the first external processor is located in the control grid of the first machine, transferring user interface control of the first machine to the first external processor, wherein the first machine is located in a space that includes a floor that can be referenced in dimensional coordinates and the control grid corresponds to a defined area of the floor in proximity to the first machine that is a subset of the space and the effective positioning area of the positioning system and wherein the space includes a second machine having an associated second defined control grid in proximity to the second machine that does not overlap with the first defined control grid; accessing control grid position information for the machine; obtaining position information for a second external processor; and using the control grid position information and the external processor or the second external processor based upon the position of each of the external processor and the second external processor.

2. The method of claim 1 wherein:

the determination of whether a first external processor is in the control grid is used to make a control transfer decision, wherein the user interface control of the first machine is transferred to the first external processor, to the exclusion of the internal user interface of the first machine.

3. The method of claim 1 further comprising:

obtaining cryptographic authentication information for a first external processor.

4. The method of claim 3 wherein:

the determination of whether a first external processor is in the control grid and the authentication information is used to make a control transfer decision.

5. The method of claim 4 wherein:

the authentication information is obtained from a user of the first external processor.

6. The method of claim 4 wherein:

the authentication information is obtained from a user of the first external processor and includes biometric information.

7. The method of claim 1 further comprising:

obtaining hierarchal priority information for the first external processor and the second external processor; and using the hierarchal priority information in determining whether to give priority of control to the first external processor or the second external processor.

8. The method of claim 1 further comprising:

downloading user interface logic data to the first external processor in response to the obtained position information of the first external processor.

9. The method of claim 1 further comprising:

obtaining updated position information for the first external processor; and using the updated position Information in determining whether to maintain external processor control of the first machine.

10. A system for selecting a first external processor as a user interface to a first machine comprising:

means for determining control grid position information for the first machine;

means for obtaining position information for the first external processor using a positioning system having an effective positioning area;

processing means for using the control grid position information and the first external processor position information in determining whether a first external processor is in the control grid of a first machine, and processing means for transferring user interface control of the first machine to the first external processor if the first external processor is located in the control grid of the first machine, wherein the first machine is located in a space that includes a floor that can be referenced in dimensional coordinates and the control grid corresponds to a defined area of the floor in proximity to the machine that is a subset of the space and the effective positioning area of the positioning system and wherein the space includes a second machine having an associated second defined control and in proximity to the second machine that does not overlap with the first defined control grid; means for accessing control grid position information for the first machine; means for obtaining position information for a second external processor; and means for using the control grid position information and the first external processor or the second external processor based upon the position of each of the first external processor and the second external processor.

11. A system for selecting a first external processor as a user interface to a first machine comprising:

a processor;

a control grid position map data base information for at least one machine connected to the processor;

a position information receiver having an effective positioning area for obtaining position information data for a first external processor;

a processor having processing instructions for using the control grid position map database and the first external processor position information in determining whether a first external processor is in the control grid of a machine, wherein the first machine is located in a space that includes a floor that can be referenced in dimensional coordinates and the control grid corresponds to a defined area of the floor in proximity to the first machine that is a subset of the space and the effective positioning area of the positioning system and wherein the space includes a second machine having an associated second defined control grid in proximity to the second machine that does not overlap with the first defined control grid; accessing control grid position information for the machine; obtaining position information for a second external processor; and using the control grid position information and the external processor or the second external processor based upon the position of each of the external processor and the second external processor.

12. The system of claim 11 wherein:

the receiver for obtaining position information Is an indoor positioning system receiver.

13. The system of claim 12 wherein:

the indoor positioning system provides relative position data relative to a reference point.

14. The system of claim 12 wherein:

the indoor positioning system provides absolute latitude and longitude data.

15. The method of claim 8 further comprising:

obtaining a second grid information for a group of machines including the first machine; and downloading user interface logic data to the first external processor when the first external processor enters the second grid.

16. The system of claim 10 wherein the means for obtaining position information comprises an indoor electromagnetic wave positioning system.

17. The system of claim 10 wherein the means for obtaining position Information comprises an ultrasonic positioning system.

* * * * *